Nov. 18, 1952     R. RUSSELL     2,618,163
BELT TIGHTENING DEVICE

Filed March 27, 1950     2 SHEETS—SHEET 1

INVENTOR
ROBERT RUSSELL
BY
Fetherstonhaugh & Co.
ATTORNEYS

Nov. 18, 1952  R. RUSSELL  2,618,163
BELT TIGHTENING DEVICE
Filed March 27, 1950  2 SHEETS—SHEET 2

INVENTOR
*ROBERT RUSSELL*
BY
*Featherstonhaugh & Co.*
ATTORNEYS

Patented Nov. 18, 1952

2,618,163

UNITED STATES PATENT OFFICE 2,618,163

BELT TIGHTENING DEVICE

Robert Russell, Britannia Beach, British Columbia, Canada

Application March 27, 1950, Serial No. 152,119

11 Claims. (Cl. 74—242.14)

This invention relates to improvements in belt tighteners.

An object of this invention is the provision of a device which can tighten and slacken belt drives quickly on band saws and other power equipment for the replacement of worn or broken belts.

Another object is the provision of a belt tightener which can slacken and tighten belt drives for quick changing of the speed ratios.

A further object is the provision of a belt tightener which has a positive simultaneous tightening control over the speed change belt, the drive belt, and the driven belt.

This device consists preferably of a housing, a cam track in the housing, supports mounted on the housing diametrically opposite each other, one of said supports being slidable lengthwise in relation to the housing, bearings mounted on the outer ends of the supports, shafts rotatably mounted in the bearings parallel to each other, pulleys fixedly mounted on the shafts directly opposite each other, a belt connecting the pulleys, an operating shaft carrying the housing, a mount adapted to support the shaft, and means on the shaft for moving the slidable support in relation to the housing and moving the latter in relation to the mount when the shaft is rotated.

Figure 1:
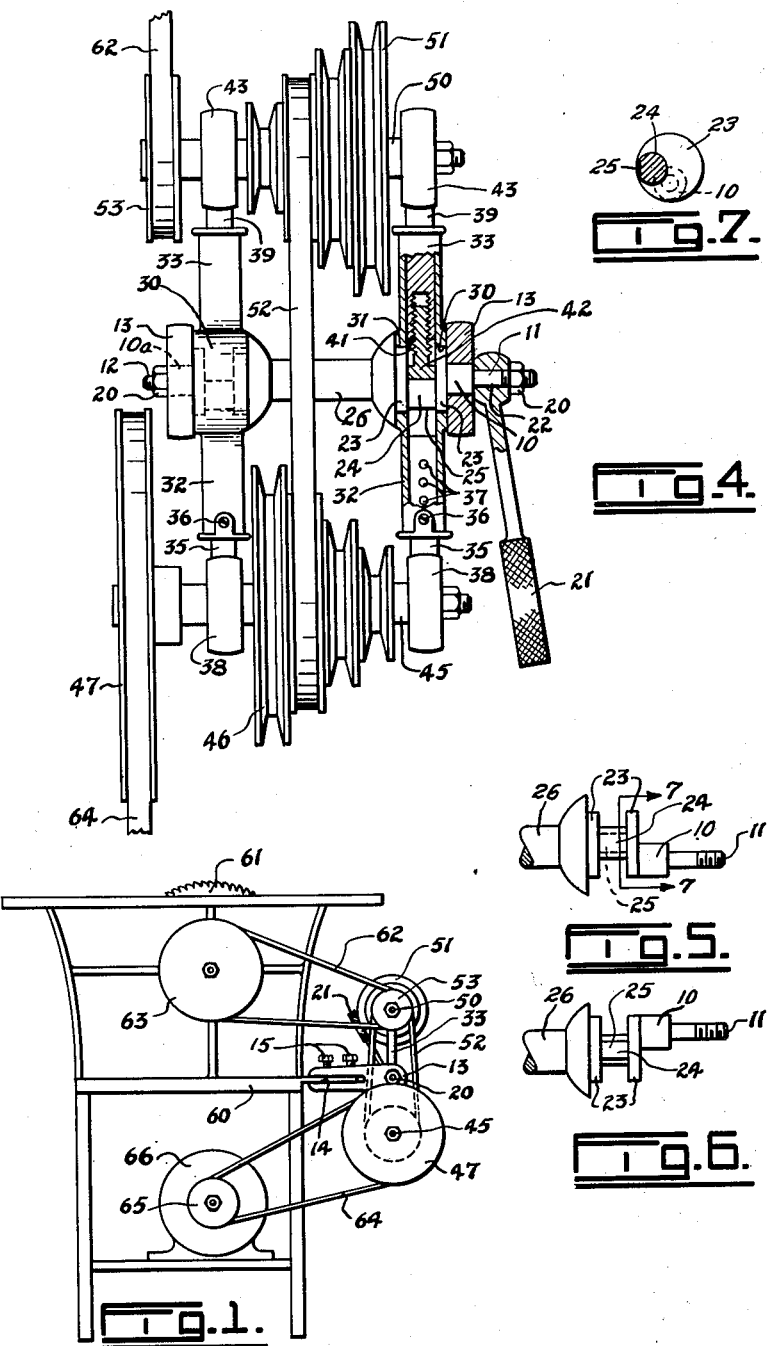
Figure 2:
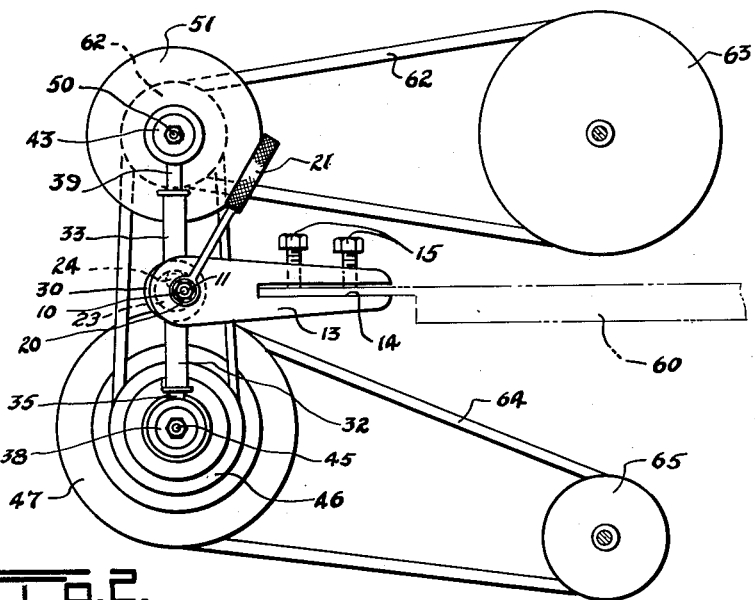
Figure 3:
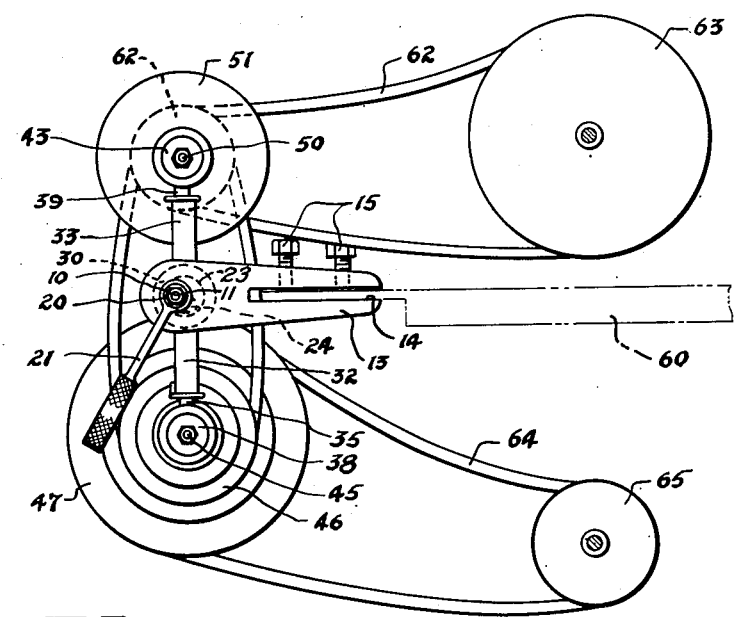

An example of this invention is illustrated in the accompanying drawings, in which:

Figure 1 is a reduced view of the device attached to a piece of power equipment, Figure 2 is a side elevation of the device with the belts in a tightened position, Figure 3 is a side elevation of the device with the belts in a loosened position, Figure 4 is an end elevation, partly in enlarged section, of the tightener, Figure 5 is an enlarged top plan of the operating shaft, Figure 6 is an enlarged top plan of the shaft rotated 180°, and Figure 7 is an enlarged sectional view taken on the line 7—7 of Figure 6.

Referring more particularly to the drawings, 10 is a stub shaft rotatably supported by a mount 13 and having a threaded reduced portion 11 projecting from one end thereof. Although one mount 13 will suffice, it is preferable to have a similar mount rotatably to support another stub shaft 10a spaced from and aligned with the stub shaft 10. The shaft 10a has a threaded reduced portion 12 projecting outwardly therefrom. These shafts are connected as hereinafter described. Each mount has a horizontal slot 14 located in its outer end and two screws 15 which can project into said slot to provide clamping means for securing the mount to a machine or the like.

Each of the reduced portions 11 and 12 of the stub shafts has a nut 20 threaded thereon to hold its shaft in position in a mount 13. The shaft 10 may be rotated in any suitable manner, such as by a handle 21, fixed on the portion 11 between the mount 13 and the nut 20.

A pair of spaced cam discs 23 is eccentrically mounted on the inner end of each of the shafts 10 and 10a adjacent their respective mounts 13.

These cam discs preferably are circular in shape. The cams of each pair are connected together by a pin 24 which is eccentric to them and eccentric to and parallel with the shaft 10. It is preferable that each pin is formed with a flat portion 25 on the side thereof, remote from the axis of the shaft 10. The throw of this pin is 90° clockwise or anticlockwise from the throw of the cams in relation to the shaft 10. The inner cams 23 of both pairs are connected together by a member 26 which is concentric to them. A housing 30 having circular tracks 31 formed therein rides on each pair of cam discs 23 which fits into the tracks thereof. This housing is provided with tubular extensions 32 and 33 which project outwardly therefrom diametrically opposite each other.

A support 35 is slidably mounted in the extension 32 of each housing 30 so that it is located at right angles to the shaft 10. A screw threaded in the extension 32 may engage one of several indentations 37 in this support to lock it in position. A bearing 38 is mounted on the outer end of each support 35.

Another support 39 is slidably mounted in the extension 33 of each housing 30. Each of the supports 39 has an inner end 41 which may directly contact the pin 24 or, if desired, an adjusting screw 42 may be located in the inner end 41, as shown in Figure 4. A bearing 43 is mounted on the outer end of each support 39.

A shaft 45 is rotatably mounted in the bearings 38 of the supports 35 and has a pulley, preferably a cone pulley 46, fixedly mounted on it between said bearings. A driven pulley 47 is fixedly mounted on the outer end of the shaft 45 remote from the handle 21. However, this pulley could be mounted on the opposite end of this shaft.

A shaft 50 is rotatably mounted in the bearings 43 of the supports 39 and has a pulley, preferably a cone pulley 51, fixedly mounted on it opposite the cone pulley 46. The pulleys 46 and 51 are joined together by a belt 52. A drive pulley 53 is fixedly mounted on the outer end of the shaft 50 opposite the driven pulley 47.

While two housings 30 and their associated elements have been described and illustrated, it is obvious that one set may be eliminated, in which case one support 13 would carry the entire load, and the bearings 38 and 43 would be the sole supports for their respective shafts.

Figure 1 shows the device installed on a base plate 60 of a power saw 61 with the screws 15 locking the mounts 13 thereto. A belt 62 connects the drive pulley 53 of the device to a pulley 63 operating the power saw. A belt 64 connects the drive pulley 47 to drive pulley 65 of an electric motor 66 or other suitable power source. It is understood that this device may be installed on power equipment other than power saw.

After installation, the belts 52, 62 and 64 can be simultaneously tightened by rotating the shaft 10 180° in either direction by means of handle 21, thus causing its pairs of cam discs 23 to rotate in the tracks 31 of the housing 30. When this movement has been completed, the housings are a distance approximately equal to double the throw of the cams 23 farther away from the power saw in a horizontal plane. During this rotational movement the pins 24 act as cranks to raise the supports 39 in the tubular extension 33 of their housings 30. When the pins 24 reach the top of their throw the flat portions 25 engage the heads of the adjusting screws 42 at the inner ends of the supports 39 and lock the shaft 10 and the handle 21 in the position shown in Figure 2.

The lateral movement of the housings 30 away from the power saw 61 causes the pulleys 47 and 53 to be spaced apart from the pulleys 64 and 63 in a vertical plane and tighten the belts 64 and 62 respectively. When the device is initially installed on the base plate 60 of the power saw 61, its mounts 13 are adjusted to give the correct tension for these belts. The pulley 53 is raised on the supports 40 during this tightening operation but does not affect the final tension on the belts 64 and 62 as the housings 30, being free to rotate about the shaft 10, equalize the tension on said belts.

The cone pulley 51 is raised at the same time as the pulley 53 and causes the belt 52 to tighten on it and the cone pulley 46.

When the belt 52 is first installed, the supports 35 are extended in the tubular extensions 32 and locked by the screws 36 in a position which gives approximately the correct tension for the belt. Final adjustment for this tension is made by turning the screws 42 in the lower ends of the supports 39.

After these adjustments have been made all belts can be simultaneously tightened or slackened for their replacement or quick changing of their speed ratios. The operation of the tightening control lever is simple, thus eliminating the need of the belts being pried over the pulley flanges or the use of wrenches for adjusting purposes.

What I claim as my invention is:

1. A belt tightener comprising a housing, supports mounted on the housing diametrically opposite each other, one of said supports being slidable lengthwise in relation to the housing, bearings mounted on the outer ends of the supports, shafts rotatably mounted in the bearings parallel to each other, pulleys fixedly mounted on the shafts directly opposite each other, a belt connecting the pulleys, an operating shaft carrying the housing, a mount adapted to support the shaft, and means on the shaft for moving the slidable support in relation to the housing and moving the latter in relation to the mount when the shaft is rotated.

2. A belt tightener comprising a housing, supports mounted on the housing diametrically opposite each other, one of said supports being slidable lengthwise in relation to the housing, bearings mounted on the outer ends of the supports, shafts rotatably mounted in the bearings parallel to each other, pulleys fixedly mounted on the shafts directly opposite each other, a belt connecting the pulleys, an operating shaft carrying the housing, a mount adapted to support the shaft, means on the shaft for moving the housing in relation to the mount when the shaft is rotated, and means connected to the shaft for moving the slidable support upon rotation of the shaft.

3. A belt tightener as claimed in claim 2 in which the means for moving the housing consists of a cam mounted on the shaft upon which the housing is mounted.

4. A belt tightener as claimed in claim 2 in which the means for moving the slidable support consists of an eccentric pin connected to the shaft within the housing and bearing against the inner end of the support.

5. A belt tightener comprising a housing, a cam track in the housing, a shaft extending into the housing, a cam on the shaft riding in the cam track of the housing, said housing being supported by the cam and the shaft, supports mounted on the housing diametrically opposite each other, one of said supports being slidably lengthwise in relation to the housing, bearings mounted on the outer ends of the supports, shafts rotatably mounted in the bearings parallel to each other, pulleys fixedly mounted on the shafts directly opposite each other, and a belt connecting the pulleys.

6. A belt tightener comprising a housing, a circular cam track in the housing, a shaft extending into the housing, a circular cam eccentrically mounted on the shaft riding in the cam track, a pin eccentrically mounted on the cam extending parallel to and eccentric to the shaft of the housing, said housing being supported by the cam and the shaft, supports mounted on the housing diametrically opposite each other, one of said supports being slidable lengthwise in relation to the housing, bearings mounted on the outer ends of the supports, shafts rotatably mounted in the bearings parallel to each other, pulleys fixedly mounted on the shafts directly opposite each other, and a belt connecting the pulleys.

7. A belt tightener comprising a housing, a cam track in the housing, a shaft extending into the housing, a cam on the shaft riding in the cam track of the housing, said housing being supported by the cam and the shaft, supports slidably mounted on the housing diametrically opposite each other, means for adjustably retaining one support in position, bearings mounted on the outer ends of the supports, shafts rotatably mounted in the bearings parallel to each other, pulleys fixedly mounted on the shafts directly opposite each other, a belt connecting the pulleys, an operating shaft carrying the housing, a mount adapted to support the shaft, and means on the shaft for moving the slidable support in relation to the housing and moving the latter in relation to the mount when the shaft is rotated directly opposite each other, and a belt connecting the pulleys.

8. A belt tightener comprising a housing, supports mounted on the housing diametrically opposite each other, one of said supports being slidable lengthwise in relation to the housing, bearings mounted on the outer ends of the supports, shafts rotatably mounted in the bearings parallel to each other, pulleys fixedly mounted on the shafts directly opposite each other, a belt connecting the pulleys, an operating shaft carrying the housing, a mount adapted to support the shaft, a cam mounted on the shaft upon which the housing is mounted for moving said housing in relation to the mount when the shaft is rotated, and a pin eccentrically mounted on the cam extending parallel to and eccentric to the shaft, said pin bearing against the inner end of the slidable support to move said support in relation to the housing upon rotation of the shaft.

9. A belt tightener as defined in claim 8, in which the throw of the pin is approximately 90° from the throw of the cam in relation to the shaft.

10. A belt tightener comprising a housing, a disc on which the housing is rotatably mounted, supports mounted on the housing diametrically opposite each other, one of said supports being slidable lengthwise in relation to the housing, bearings mounted on the outer ends of the supports, shafts rotatably mounted in the bearings parallel to each other, pulleys fixedly mounted on the shafts directly opposite each other, a belt connecting the pulleys, an operating shaft on which the disc is mounted, a mount for supporting the shaft, an eccentric pin on the disc bearing against the inner end of the slidable support for moving said support in relation to the housing when the shaft is rotated.

11. A belt tightener comprising a housing, a cam disc on which the housing is rotatably mounted, supports mounted on the housing diametrically opposite each other, bearings mounted on the outer ends of the supports, shafts rotatably mounted in the bearings parallel to each other, pulleys fixedly mounted on the shafts directly opposite each other, a belt connecting the pulleys, an operating shaft on which the cam disc is eccentrically mounted, and a mount for supporting the shaft, said housing being moved in relation to the mount by the cam upon rotation of the shaft.

ROBERT RUSSELL.

REFERENCES CITED

The following references are of record in the file of this patent:

UNITED STATES PATENTS

| Number | Name | Date |
|---|---|---|
| 1,488,617 | Robinson | Apr. 1, 1924 |
| 1,913,040 | Pierson | June 6, 1933 |

FOREIGN PATENTS

| Number | Country | Date |
|---|---|---|
| 217,843 | Switzerland | June 16, 1942 |